(12) United States Patent
Iwanaga (10) Patent No.: US 8,142,032 B2
(45) Date of Patent: Mar. 27, 2012

(54) OPTICAL SYSTEM UNIT FOR PROJECTING IMAGES AND INCLUDING LIGHT SMOOTHING UNIT FORMED INTO SUBSTANTIALLY TRUNCATED QUADRANGULAR PYRAMID, AND PROJECTOR INCLUDING THE SAME OPTICAL SYSTEM

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 382 days.

(21) Appl. No.: 12/144,359

(22) Filed: Jun. 23, 2008

(65) Prior Publication Data

US 2008/0316440 A1    Dec. 25, 2008

(30) Foreign Application Priority Data

Jun. 25, 2007 (JP) ................. 2007-166010
Nov. 8, 2007 (JP) ................. 2007-290639

(51) Int. Cl.
*G03B 21/28* (2006.01)
*G03B 21/14* (2006.01)

(52) U.S. Cl. ............. 353/98; 353/20; 353/99

(58) Field of Classification Search ............ 353/20, 353/98, 99
See application file for complete search history.

(56) References Cited

U.S. PATENT DOCUMENTS

| 6,547,401 | B2 * | 4/2003 | Nishida et al. ............ 353/98 |
| 6,840,633 | B2 * | 1/2005 | Davis et al. ............. 353/98 |
| 6,964,482 | B2 | 11/2005 | Fujisawa et al. |
| 7,185,985 | B2 | 3/2007 | Hanano |
| 7,258,450 | B2 * | 8/2007 | Koyama et al. ........... 353/94 |
| 7,350,924 | B2 | 4/2008 | Hanano |
| 2004/0062044 | A1 | 4/2004 | Hanano |
| 2004/0080833 | A1 | 4/2004 | Fujisawa et al. |

(Continued)

FOREIGN PATENT DOCUMENTS

CN    1538200 A    10/2004

(Continued)

OTHER PUBLICATIONS

Japanese Office Action dated Jun. 18, 2009 (5 pages), and English translation thereof (5 pages), issued in counterpart Japanese Application Serial No. 2007-290639.

(Continued)

*Primary Examiner* — Tony Ko
(74) *Attorney, Agent, or Firm* — Holtz, Holtz, Goodman & Chick, PC (57) ABSTRACT

An optical system unit having a light smoothing unit for emitting a light beam which is substantially parallel to an optical axis and a projector including the optical system unit are provided. The optical system unit includes a light source-side optical system, a display device for forming an image by reflected light and a projection-side optical system, whereby a light beam emitted from the light source unit is shone on to the display device via the light source-side optical system, an image is formed by the display device, and the image so formed is projected on to a screen via the projection-side optical system. The light smoothing unit of the light source-side optical system is such that at least one side of sides other than an incident side and an emitting side is disposed obliquely relative to a side which the at least one side confronts so that an area of the emitting side becomes larger than an area of the incident side.

11 Claims, 12 Drawing Sheets

U.S. PATENT DOCUMENTS

2007/0091271 A1    4/2007    Hanano

FOREIGN PATENT DOCUMENTS

| | | |
|---|---|---|
| JP | 2000-221499 A | 8/2000 |
| JP | 2004-053970 A | 2/2004 |
| JP | 2004-102132 A | 4/2004 |
| JP | 2006-098936 A | 4/2006 |
| JP | 2007-065148 A | 3/2007 |

OTHER PUBLICATIONS

Chinese Office Action dated Jul. 24, 2009 and English translation thereof issued in a counterpart Chinese Application No. 2008101306108.

* cited by examiner

OPTICAL SYSTEM UNIT FOR PROJECTING IMAGES AND INCLUDING LIGHT SMOOTHING UNIT FORMED INTO SUBSTANTIALLY TRUNCATED QUADRANGULAR PYRAMID, AND PROJECTOR INCLUDING THE SAME OPTICAL SYSTEM

CROSS-REFERENCE TO RELATED APPLICATIONS

This application is based upon and claims the benefit of priorities from the prior Japanese Patent Application No. 2007-166010, filed on Jun. 25, 2007 and Japanese Patent Application No. 2007-290639 filed on Nov. 8, 2007; the entire contents of which are incorporated herein by reference.

BACKGROUND OF THE INVENTION

The present invention relates to an optical system unit and a projector including the same optical system unit.

Currently, data projectors are used in many cases as image projectors for projecting images displayed on a screen of a personal computer, video images and, furthermore, images by image data stored in a memory card on to a screen.

The data projectors are such that a light source unit which includes a light source such as a metal halide lamp or an extra-high pressure mercury lamp or a light source made up of light emitting diodes is incorporated and light emitted from the light source unit is collected on to a display device which includes arrays of microscopic mirrors, called Digital Micromirror Devices (DMDs), or a display device made up of a liquid crystal plate, so that an optical image formed on the display device is projected as a full color image on to a screen via a lens group having a zooming function which constitutes a projection-side optical system.

In projectors like those described above, a light guiding or light smoothing unit such as a light tunnel or glass rod is disposed on an optical axis of light emitted from the light source unit so that the intensity of light is uniformly distributed across the width of a light beam which passes therethrough. However, the light beam shone on to the display device is distributed in a diffuse fashion due to the light beam passing through other light source-side optical systems after it has been emitted from the light smoothing unit, and this has sometimes increased unnecessary light.

SUMMARY OF THE INVENTION

The invention has been made in view of the above described situations, and an aspect thereof is to provide an optical system unit for projecting images having a light smoothing unit which can emit light that has been emitted from a light source unit as a light beam which is substantially parallel to an optical axis and a diaphragm of a shape which is suitable for the light beam which is emitted from the light smoothing unit and with which an image is formed on a display device, and a projector which includes the optical system unit for projecting images.

According to an aspect of the invention, there is provided an optical system unit for projecting images including a light source-side optical system having a light smoothing unit for uniformly distributing the intensity of incident light and emitting the light so distributed, a display device for forming an image by reflected light and a projection-side optical system, whereby a light beam emitted from a light source unit is shone on to the display device via the light source-side optical system so as to form an image by the display device and projecting the image so formed on to a screen via the projection-side optical system, wherein the light smoothing unit of the light source-side optical system is constructed such that at least one side of sides other than an incident side and an emitting side is made oblique relative to a side which the at least one side confronts in such a manner that an area of the emitting side becomes larger than an area of the incident side.

BRIEF DESCRIPTION OF THE DRAWINGS

FIG. 12A is a perspective view of a light smoothing rod according to an embodiment of the present invention, FIG. 12B is a cross-sectional view taken along lines B-B in FIG. 12A, and 12C is a cross-sectional view taken along line C-C in FIG. 12A.

DESCRIPTION OF THE PREFERRED EMBODIMENT

A projector 10 of a best mode for carrying out of the invention is such as to include a light source unit 63, an optical system unit 70, a cooling fan, and a projector control unit 38. The optical unit 70 includes a light source-side optical system 62, a display device 51 for forming an image by reflected light, and a projection-side optical system 90 which is a lens group having a zooming function, whereby a light beam emitted from the light source unit 63 is shone on to the display device 51 via the light source-side optical system 62 so as to form an image by the display device 51, and the image so formed is then projected on to a screen via the projection-side optical system 90.

In addition, the light source unit 63 includes plural colors of light emitting diodes 64, condenser lenses 65 which collect light beams emitted, respectively, from the light emitting diodes 64, and a dichroic prism 66. A red light emitting diode 64R, a green light emitting diode 64G and a blue light emitting diode 64B are disposed on three sides of the dichroic prism 66, respectively, and the condenser lenses 65 are disposed between the dichroic prism 66 and the light emitting diodes 64 in the respective colors.

Additionally, the optical system unit 70 includes a light guiding or smoothing unit which makes up the light source-side optical system 62. This light smoothing unit is a light tunnel 75, and this light tunnel 75 has four quadrangular plates which constitute upper and lower plates 76 and both lateral side plates 77, and the lateral side plates 77 are disposed in such a manner as to confront each other in an oblique or tapered fashion so that an area of an emitting side 75b becomes larger than an area of an incident side 75a. In addition, the upper and lower plates 76 are placed, respectively, on and underneath upper and lower horizontal sides of the lateral side plates 77 and are fixedly bonded thereto along the vicinities of ridges so that the light tunnel 75 is formed into a substantially truncated quadrangular pyramid. The incident side 75a is formed into a square, while the emitting surface 75b is formed into a rectangle.

In addition, in a projection-side block 80 which incorporates the projection-side optical system 90, a diaphragm 98 is disposed in the lens group having the zooming function, and this diaphragm 98 has an opening which is formed into a vertically elongated oval shape.

Figure 1:
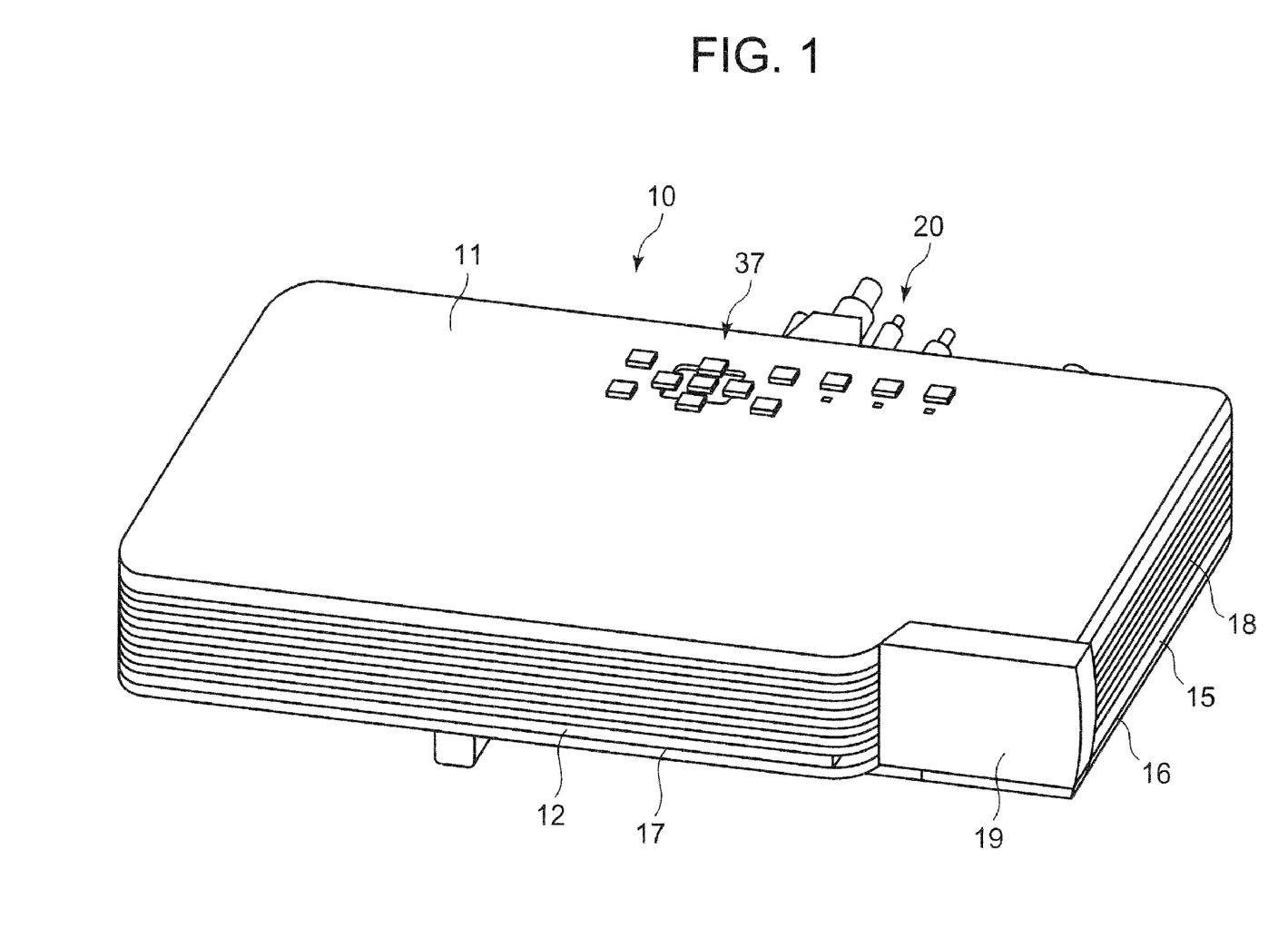
FIG. 1 is a perspective view showing an external appearance of a projector according to an embodiment of the invention.

Hereinafter, an embodiment of the invention will be described based on the drawings. A projector 10 according to an embodiment of the invention is, as is shown in FIG. 1, formed into a substantially rectangular parallelepiped shape and has a lens cover 19 which covers a projection port to the side of a front plate 12 which constitutes a front side plate of a main body casing and a plurality of air outlet holes 17 in the front plate 12. Furthermore, although not shown, the projector 10 has an Ir receiver unit which receives a control signal from a remote controller.

In addition, a keys/indicators section 37 is formed on a top plate 11 which makes up the main body casing, and the keys/Indicators section 37 is such as to include keys and indicators such as a power supply switch key, a power indicator which informs that a power supply is on or off, a lamp switch key for turning on a lamp of a light source unit, a lamp indicator for indicating that the lamp is turned on, and an overheat indicator for informing that the light source unit overheats.

Furthermore, on a back side of the main body casing thereof, the projector 1 includes various types of terminals 20 which include an input/output connectors section where a USB terminal and an image signal inputting D-SUB terminal, an S terminal, an RCA terminal and the like are provided and a power supply adaptor plug.

In addition, a plurality of air inlet holes 18 are formed in a right side plate 14 which is a side plate of the main body casing which is not shown and in a lower vicinity of left side plate 15 which is a side plate shown in FIG. 1.

Figure 2:
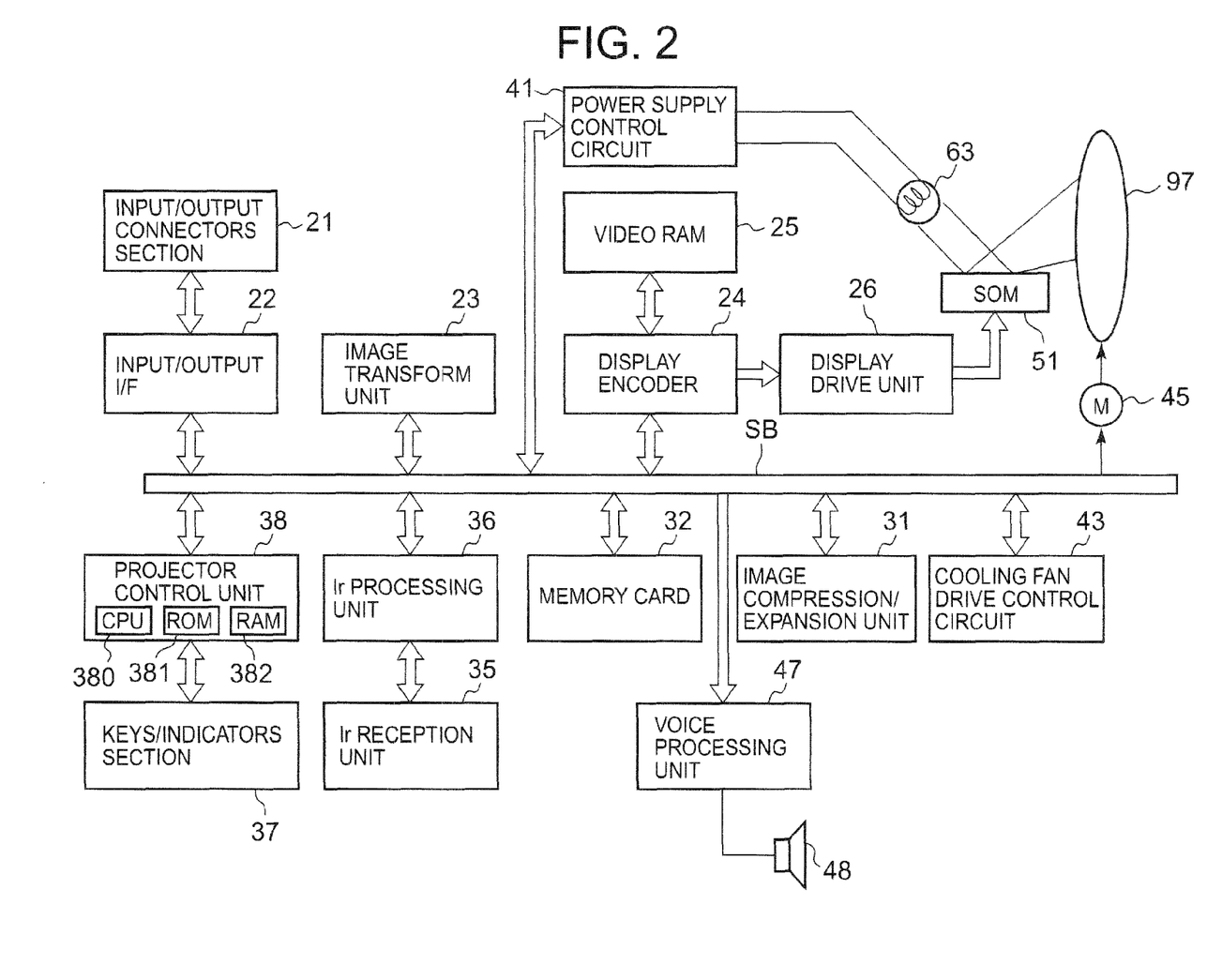
FIG. 2 is a function circuit block diagram of the projector according to the embodiment of the invention.

Additionally, a control circuit of the projector 10 has, as is shown in FIG. 2, a projector control unit 38, an input/output interface 22, an image transform unit 23, a display encoder 24, a display drive unit 26 and the like. Picture signals of various standards which are inputted from an input/output connectors section 21 are sent to the image transform unit 23 via the input/output Interface 22 and a system bus (SB) and are transformed in the image transform unit 23 in such a way as to be integrated into a picture signal of a predetermined format which is suitable for display, and the picture signal so transformed is then sent to the display encoder 24.

This display encoder 24 deploys the picture signal so sent thereto on a video RAM 25 so as to be stored therein and thereafter generates a video signal from the contents stored in the video RAM 25 for output to the display drive unit 26.

The display drive unit 26 into which the video signal is inputted from the display encoder 24 drives a display device 51, which is a spatial optical modulator (SOM), at an appropriate frame rate in response to the picture signal sent thereto. A light beam emitted from a light source unit 63 is made to be incident on the display device 51 via a light source-side optical system so as to form an optical image by reflected light from the display device 51, and the optical image so formed is then projected to be displayed on a screen, not shown, via a projection system lens group which constitutes a projection-side optical system. A movable lens group 97 of the projection-side optical system is driven by a lens motor 45 for zooming adjustment or focusing adjustment.

In addition, an image compression/expansion unit 31 performs a recording operation in which a luminance signal and a color difference signal of the picture signal are data compressed through ADTC and Huffman coding so as to be written sequentially on a memory card 32 which is a detachable recording medium, and in a reproducing mode, the image compression/expansion unit 31 reads out image data recorded in the memory card 32 so as to expand individual image data which constitute a series of moving pictures one frame by one frame and sends the image data so expanded to the display encoder 24 via the image transform unit 23, so as to enable the display of moving pictures or the like based on the mage data stored in the memory card 32.

In addition, the projector control unit 38 is such as to govern the control of operations of respective circuits in the projector 10 and is made up of a CPU 380, a ROM 381 which fixedly stores operation programs for various types of settings, a RAM 382 which is used as a work memory.

In addition, operation signals of the keys/indicators section 37 which is made up of the main keys and indicators which are provided on the top plate 11 of the main body casing are sent directly to the projector control unit 38, and key operation signals from the remote controller are received by an Ir receiver unit 35, and a code signal which is demodulated by an Ir processor unit 36 is then sent to the projector control unit 38.

Note that a voice processing unit 47 is connected to the projector control unit 38 via a system bus (SB), and the voice processing unit 47 includes a voice source circuit such as a PCM voice source so as to convert voice data into analog data and drive a speaker 48 to emit sound loudly therefrom in projection and reproduction modes.

In addition, the projector control unit 38 controls a power supply circuit 41. When the lamp switch key is operated, the projector control unit 38 causes the power supply control circuit 41 to turn on the light source unit 63 and furthermore, causes a cooling fan drive circuit 43 to perform temperature detections by a plurality of temperature sensors provided on the light source unit 63 and the like so as to control the rotational speed of a cooling fan. The projector control unit 38 also causes a timer or the like to make the cooling fan continue to rotate even after the light source unit 63 has been turned off. Furthermore, depending upon the results of the temperature detections by the temperature sensors, the projector control unit 38 controls the light source unit 63 to be stopped to switch off the power supply of the projector main body.

Figure 3:
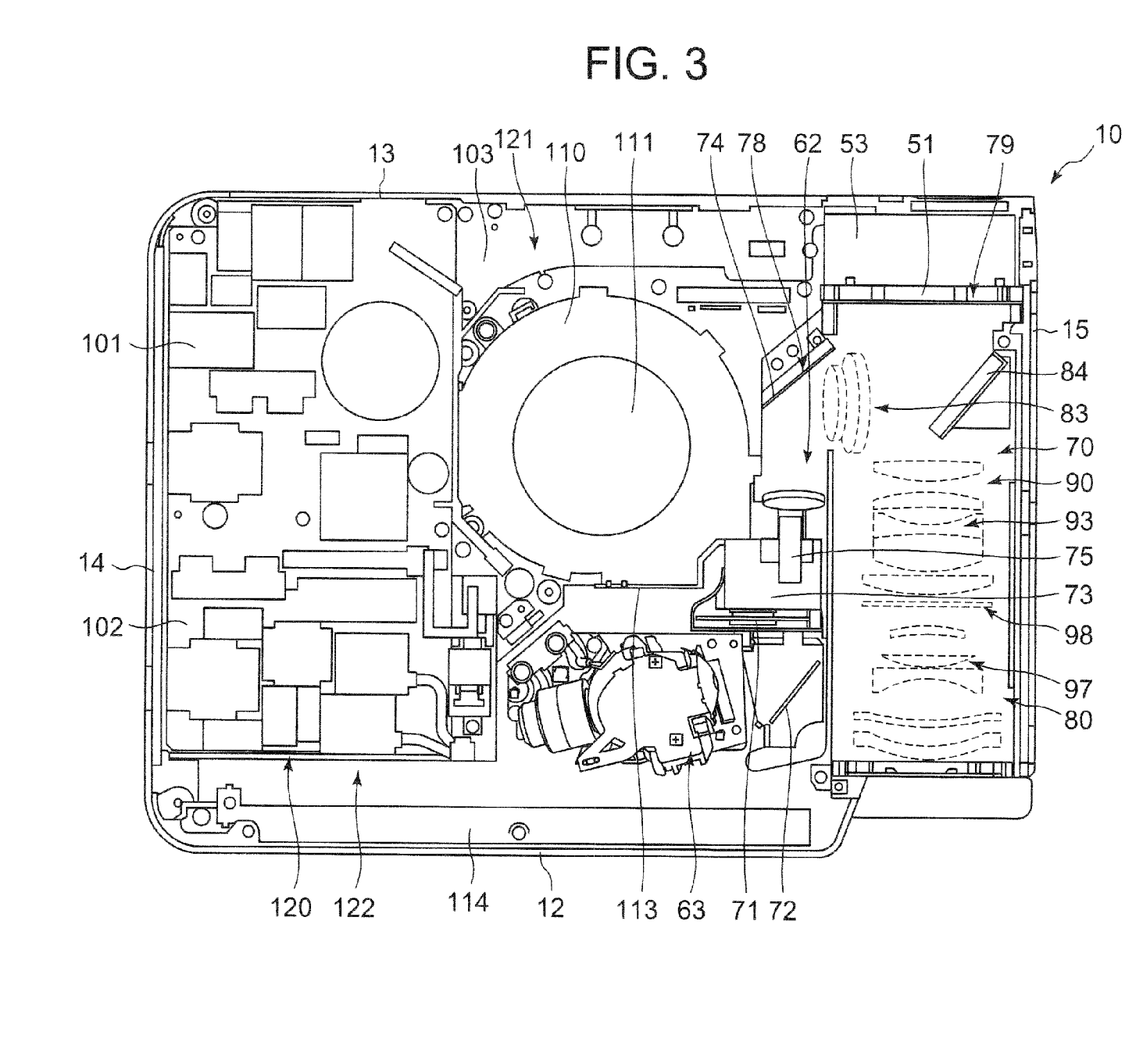
FIG. 3 is a top view of the projector of the embodiment according to the invention in which a discharge lamp is used for a light source unit, with a top plate of the projector removed.

These ROM 381, RAM 382, IC and circuit devices are mounted on a control circuit board 103 which functions as a main control circuit board shown in FIG. 3. The power supply control circuit 41 which is of the power system is incorporated in a power supply circuit block 101, and a control circuit board 103 which is a main circuit board of a control system is formed separately from a power supply control circuit board 102 on which the power supply control circuit block 101 of the power system is mounted.

As is shown in FIG. 3, an interior of the projector 10 is constructed such that the power supply control circuit board 102 on which the power supply circuit block 101 is mounted is disposed in the vicinity of the right side plate 14 and that an interior of the housing is partitioned airtightly into an inlet-side space compartment 121 which lies to face a back plate 13 and an outlet-side space compartment 122 which lie to face the front plate 12 by a partitioning bulkhead 120. In addition, a sirocco fan-type blower 110, which is made to function as a cooling fan, is disposed in such a manner that an inlet sort 111 of the blower 110 is positioned in the inlet-side space compartment 121 and an outlet port 113 of the blower 110 is positioned on a boundary between the outlet-side space compartment 122 and the inlet-side space compartment 121.

In addition, disposed in the outlet-side space compartment 122 are the light source unit 63, a first reflection mirror 72 which reflects light emitted from the light source unit 63 towards the optical system unit 70, an illumination-side block 78 of the optical system unit 70, and a discharged air temperature reduction unit 114.

This light source unit 63 has a reflector which is formed into the shape of a ellipsoid of revolution or paraboloid of revolution and whose top and bottom are cut off to be flat and a discharge lamp using halogen or the like which is incorporated in an interior of the reflector. A circular disc-shaped color wheel 71, which has red, green and blue sector filters which are provided in such a manner as to be aligned in a circumferential direction, is disposed on an optical axis of the light source unit 63, and this color wheel 71 is made to rotate by a wheel motor 73. In addition, a light beam emitted from the light source unit 63 is colored by the color wheel 71 and is then incident on the optical system unit 70.

Figure 4:
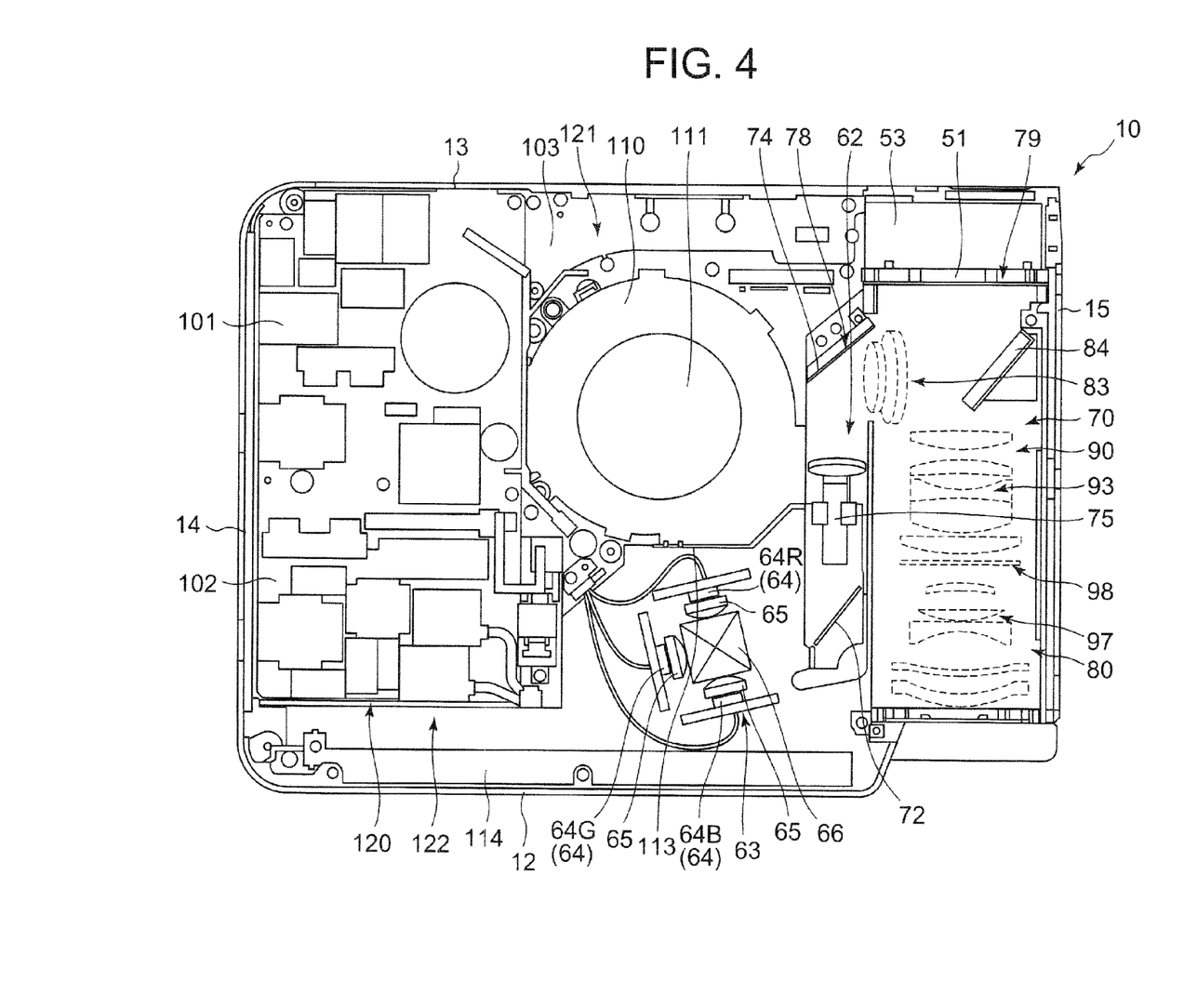
FIG. 4 is a top view of the projector of the embodiment according to the invention in which light emitting diodes are used for a light source unit, with a top plate of the projector removed.

In addition, as the light source unit 63, as is shown in FIG. 4, a light source unit can be used which utilizes light emitting diodes 64. The light source unit 63 which utilizes the light emitting diodes 64 is such as to include a red light emitting diode 64R, a green light emitting diode 64G, a blue light emitting diode 64B, condenser lenses 65 which collect light emitted from the corresponding light emitting diodes 64 and a dichroic prism 66.

Then, the light emitting diodes 64 in the respective colors are disposed, respectively, on three sides of the dichroic prism 66, and the condenser lenses 65 are interposed, respectively, between the light emitting diodes 64 and the dichroic prism 66. The light emitting diodes 64 in the respective colors are time division controlled by the projector control unit, and since the respective light emitting diodes 64 emit the three primary colors of light, that is, red, green and blue, light does not have to be colored by the color wheel 71, and hence, light emitted from the light emitting diodes 64 can be used directly in the optical system unit 70.

In addition, in the light source unit 63 which utilizes the light emitting diodes 64 as the light sources, since the condenser lenses 65 are disposed, respectively, in the vicinity of the light emitting diodes 64, in the event that a sufficient amount of light cannot be provided by the single light emitting diode 64, light emitting diodes 64 of the same color are arranged in an array in such a manner that light emitted from the light emitting diodes 64 so arranged is collected by the corresponding condenser lens 65, so that the lack of light is supplemented. Additionally, since the amount of light from the green light emitting diode 64G is less than the amount of light from the red and blue light emitting diodes 64R, 64B, by disposing more light emitting diodes 64G, the amounts of light from the light emitting diodes can be made uniform.

In addition, the optical system unit 70 is made up of three blocks; the illumination-side block 78 which is disposed in the vicinity of the light source unit 63, an image forming block 79 and the projection-side block 80, and is disposed in such a manner as to extend along the left side plate 15.

The illumination-side block 78 includes part of the light source-side optical system 62 for guiding light emitted from the light source unit 63 to the display device 51 that the image forming block 79 possesses. Raised as components belonging to the light source-side optical system 62 that the illumination-side block 78 possesses are a light tunnel 75 as a light guiding or smoothing unit for converting light emitted from the light source unit 63 into a light beam in which the intensity of light is uniformly distributed across the width thereof, a collective lens for collecting light that has passed through the light tunnel 75 and the like.

Figure 5:
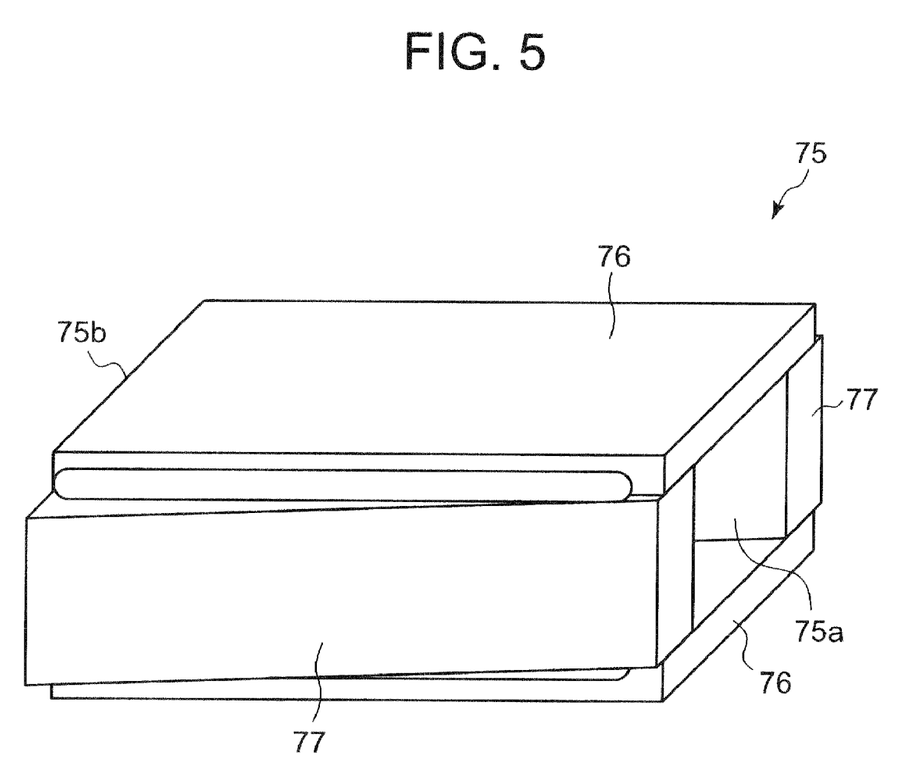
FIG. 5 is a perspective view of a light tunnel according to the embodiment of the invention.
Figure 6A:
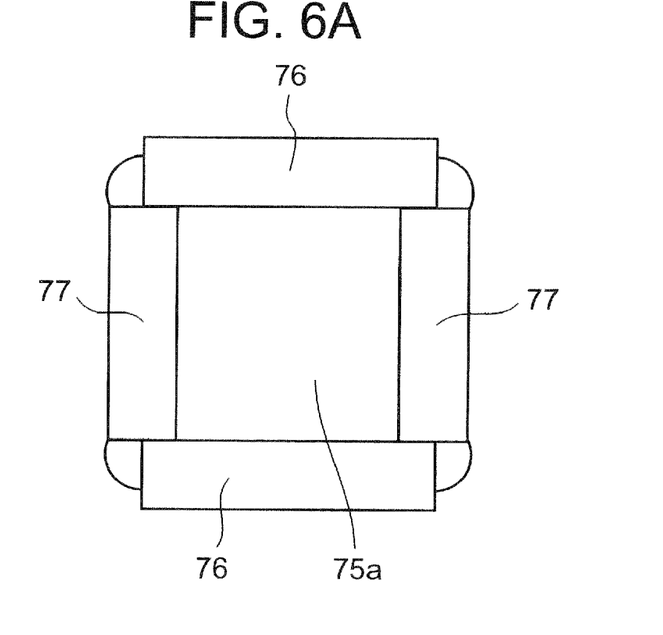
FIG. 6A and FIG. 6B show front views of an incident side and an emitting side of the light tunnel according to the embodiment of the invention.
Figure 6B:
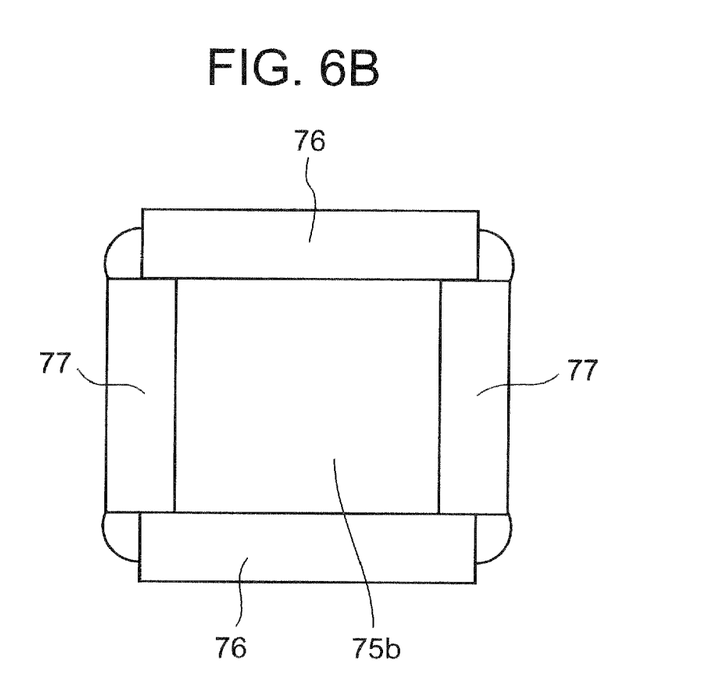

This light tunnel 75 includes, as is shown in FIG. 5, an incident side 75a and an emitting side 75b which are situated parallel to each other and at right angles to the optical axis and has four substantially quadrangular plates which constitute upper, lower, left and right sides of the tunnel. Specifically, upper and lower plates 76 are placed, respectively, on and underneath upper and lower horizontal sides of both lateral side plates 77 which are disposed in such a manner as to confront in an oblique or tapered fashion and are then fixedly bonded thereto along the vicinities of ridges, so that the light tunnel 75 is formed into a substantially truncated quadrangular pyramid with the upper plate 76 and the lower plate 76 disposed parallel to each other. Inner surfaces of the light tunnel 75 are made to constitute reflection surfaces. In addition, the incident side 75a is, as is shown in FIG. 6A, formed into a square, and the emitting side 75b is, as is shown in FIG. 6B, formed into a horizontally elongated rectangle.

In addition, the light tunnel 75 of this embodiment has the incident side of 4 mm×4 mm and the emitting side of 4 mm×5 mm and a longitudinal length of 28.6 mm. The obliqueness or inclination of the lateral side plates 77 is on the order of one degree relative to the optical axis X.

By forming the light tunnel 75 in the way described above, light incident from the incident side 75a is corrected by two degrees which is double the inclination angle of the lateral side plates 77 each time the light is reflected on the lateral side plates 77, whereby the light becomes more parallel to the optical axis X, and thus, the incident light becomes light which is nearly parallel to the optical axis X after it has been reflected on the lateral side plates 77 a plurality of times and is then emitted from the emitting side 75b.

Figure 7A:
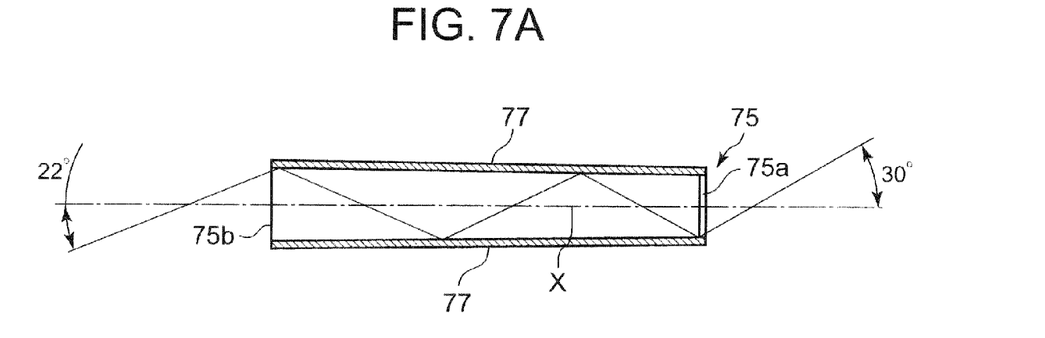
FIG. 7A, FIG. 7B and FIG. 7C show concept diagrams showing how light is guided in the light tunnel according to the embodiment of the invention.
Figure 7B:
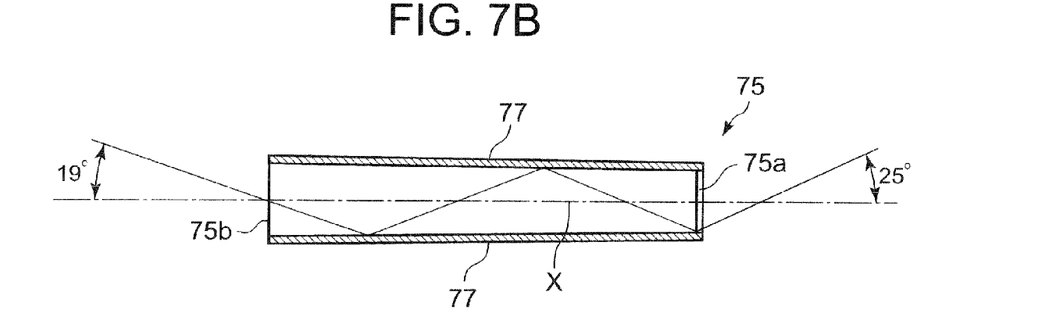
Figure 7C:
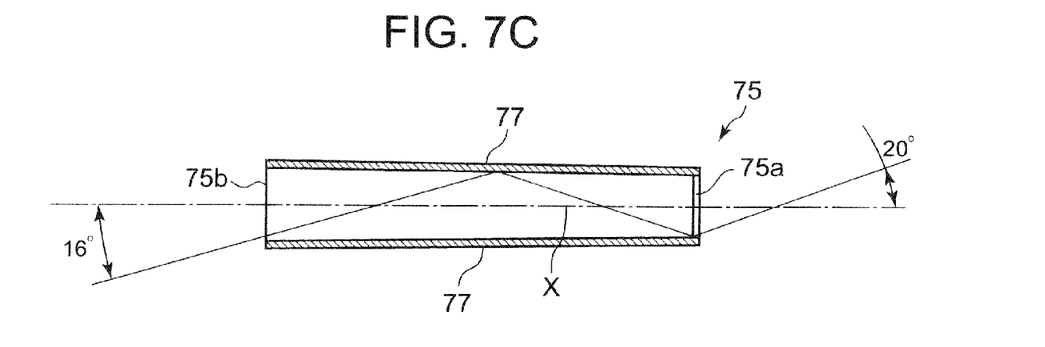

Namely, as is shown in FIG. 7A, a light beam which is incident on the light tunnel 75 at an angle of 30 degrees relative to the optical axis X reduces the angle formed between the optical axis X and itself by two degrees every time the light beam is reflected on the lateral side plates 77, and when being reflected on the lateral side plates 77 four times, the light beam is emitted from the emitting side 75b as a light beam which intersects the optical axis at an angle of 22 degrees. In addition, as is shown in FIG. 7B, a light beam which is incident on the light tunnel 75 at an angle of 25 degrees relative to the optical axis X is reflected on the lateral side plates 77 three times and is then emitted as a light beam which intersects the optical axis X at an angle of 19 degrees, and as is shown in FIG. 7C, a light beam which is incident on the light tunnel 75 at an angle of 20 degrees relative to the optical axis X is reflected on the lateral side plates 77 two times and is then emitted as a light beam which intersects the optical axis X at an angle of 16 degrees.

Consequently, since light which is incident at a larger angle relative to the optical axis X is reflected on the lateral side plates 77 more times, an angle at which the light is eventually corrected becomes large, while since light which is incident at a smaller angle relative to the optical axis X is reflected on the lateral side plates 77 fewer times, an angle at which the light is eventually corrected becomes small. Consequently, many light beams that are emitted from the light tunnel 75 become nearly parallel to the optical axis X and include light components whose diffuse angle is small, so that the resulting light beams can be collected or made to converge in a small range.

In addition, as is shown in FIGS. 3 and 4, the image forming block 79 has a second reflection mirror 74 which changes the direction of light emitted from the light tunnel 75, a light source-side lens group 83 which is made up of a plurality of lenses for collecting light reflected on the second reflection mirror 74 on to the display device 51 and a shining mirror 84 which shines light that has passed through the light source-side lens group 83 on to the display device 51 at a predetermined angle as the light source-side optical system 62, and furthermore, includes arrays of microscopic mirrors called Digital Micromirror Devices or DMDs which make up the display device 51. In addition, a display device cooling unit 53 for cooling the display device 51 is disposed on a back plate 13 side of the display device 51, so as to prevent the display device 51 from being heated to high temperatures.

Furthermore, the projection-side block 80 has a lens group of the projection-side optical system 90 for emitting light which is reflected on the display device 51 to form an image on to a screen, and the projection-side optical system 90 includes a fixed lens group 93 which is incorporated in a fixed lens barrel and a movable lens group 97 which is incorporated in a movable lens barrel to thereby be formed into a variable focus lens having a zooming function. The movable lens group 97 is moved by a lens motor for zooming adjustment or focusing adjustment.

Figure 8:
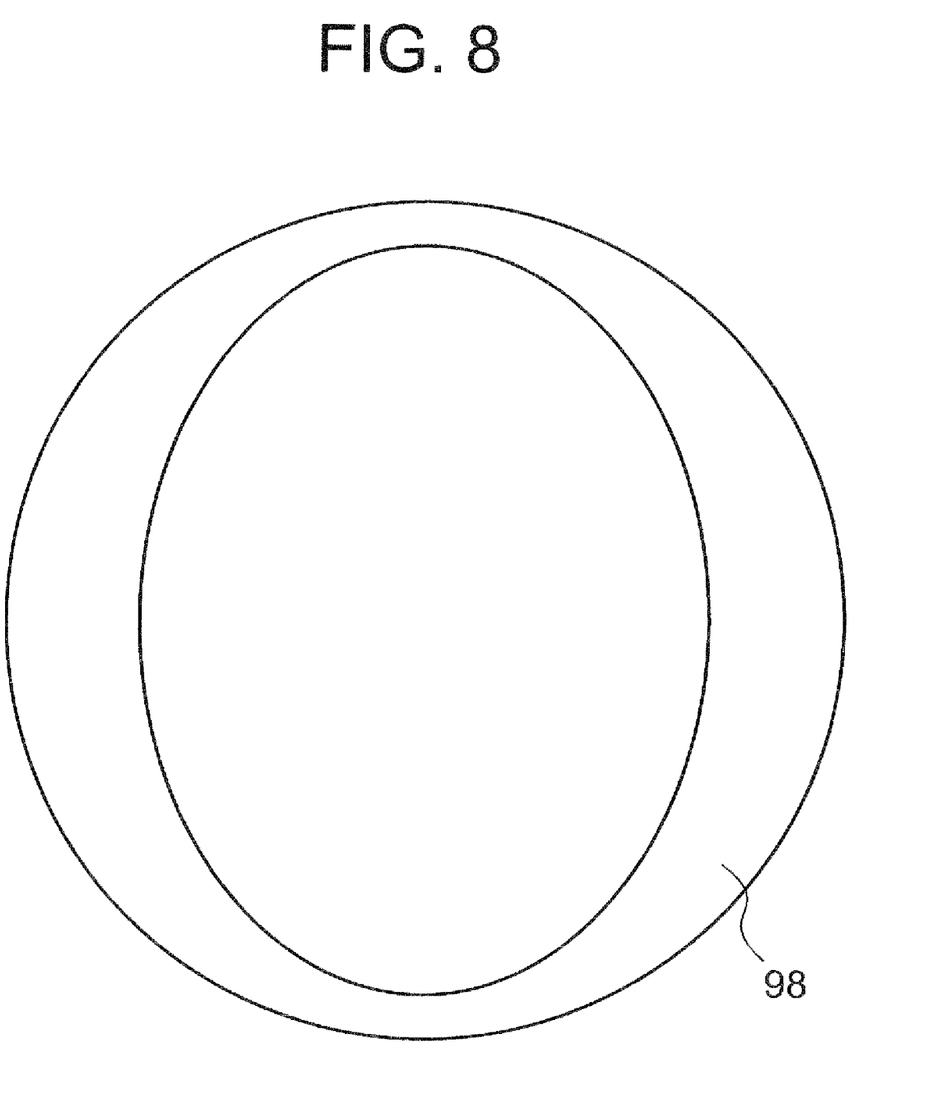
FIG. 8 is a front view of a diaphragm according to the embodiment of the invention.

In addition, a diaphragm 98 for the projection-side optical system 90 is provided between the fixed lens group 93 and the movable lens group 97, and as is shown in FIG. 8, this diaphragm 98 has an opening which is formed into a vertically elongated oval shape. The diaphragm 98 which has the vertically elongated oval opening enables the improvement of lateral image focusing performance in association with the improvement in light convergence by increasing a lateral light condensing density for light beams emitted from the light tunnel 75 by disposing the lateral side plates 77 of the light tunnel 75 in such a manner as to confront each other in the oblique or tapered fashion, and furthermore, the reduction in image forming light is prevented while cutting off stray light by the diaphragm 98.

According to this embodiment, by disposing the lateral side plates 77 of the light tunnel 75 in such a manner as to confront each other in the oblique or tapered fashion so that in the light tunnel 75 which makes up the light smoothing unit, the area of the emitting side 75*b* is made larger than the area of the incident side 75*a*, since the lateral angle at which the light beam is emitted laterally from the light tunnel 75 can be made to approach the parallelism with the optical axis X so as to improve in lateral convergence, the lateral image forming performance can be improved. Furthermore, since there are fewer lateral diffuse components, unnecessary light can be reduced, thereby making it possible to increase the utilization efficiency of light emitted from the light source 63.

In addition, by forming the incident side 75*a* into the square and the emitting side 75*b* into the rectangle, incident light incident on the light smoothing unit is made to be incident efficiently without any wastefulness, so that the light beam emitted from the light smoothing unit is formed into a light beam which assumes a shape which is close to the shape of the display device 51. Moreover, since much light which is nearly parallel to the optical axis X can be emitted in the horizontal direction, stray light which is to be removed by the projection-side optical system 90 can be reduced, thereby making it possible to increase the utilization efficiency of light emitted from the light source 63.

Furthermore, by placing the upper and lower plates 76, respectively, on and underneath the lateral sides of the lateral side plates 77 which are disposed in such a manner as to confront each other in the oblique or tapered fashion and fixedly bonding them together along the vicinities of ridges so that the light tunnel 75 is formed into a substantially truncated quadrangular pyramid, the light tunnel 75 which utilization efficiency of light emitted from the light source unit 63 is increased can be easily produced by using the same members as those used in the conventional light tunnel 75.

In addition, by disposing the diaphragm 98 having the vertically elongated opening in the projection-side block 80, unnecessary light can be eliminated, thereby making it possible to provide the projector 10 which can project a clear image in which contrast is increased.

Additionally, by using the light emitting diodes 64 as the light source of the light source unit 63, the necessity of the color wheel 7L is obviated, and the light source unit 63 is made smaller in size, whereby the projector 10 can be realized which is thinner in thickness and smaller in size. Furthermore, since the heat value of the light emitting diode 64 is smaller than that of a discharge lamp, countermeasures to be taken against heat become easy.

Furthermore, by disposing the condenser lenses 65 in the vicinity of the corresponding light emitting diodes 64, in the event that an sufficient amount of light cannot be supplied by the single light emitting diode, a plurality of light emitting diodes can be disposed. In addition, by disposing the light emitting diodes 64 on the three side of the dichroic prism 66, the number of light emitting diodes 64 in a specific color can be easily increased so as to make uniform the amounts of light in the respective colors.

Figure 9:
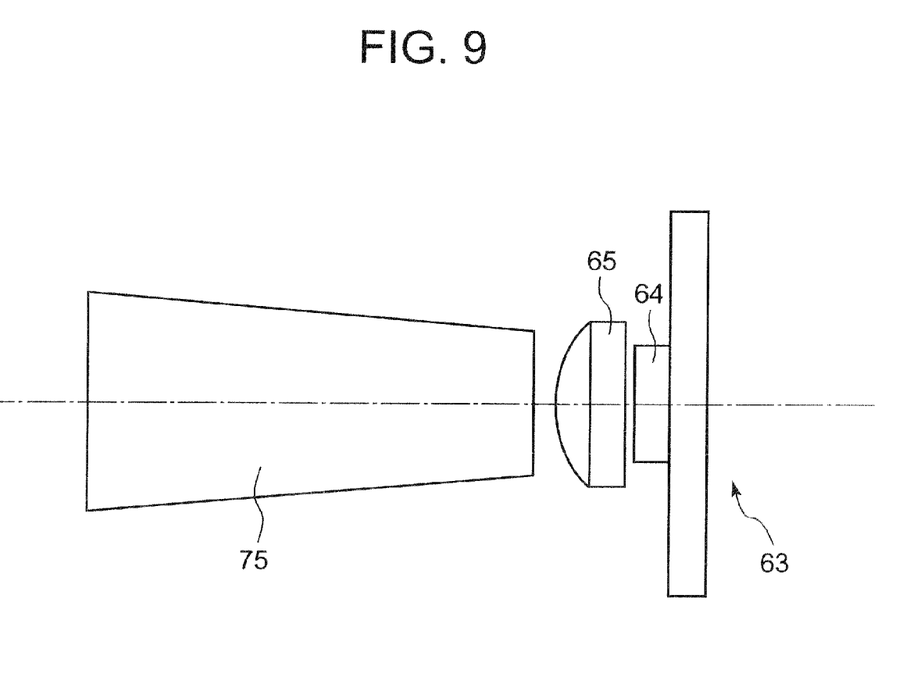
FIG. 9 is a schematic top view showing a light source unit and a light smoothing unit according to a modified example of the invention.

In addition, while in the light source unit 63 described above, the red, green and blue light emitting diodes 64 are disposed, respectively, on the three sides of the dichroic prism 66, the light source unit 63 may be configured such that the light emitting diodes in the respective colors are not disposed, respectively, on the three sides of the dichroic prism 66 but are arranged in an array, and as is shown in FIG. 9, the condenser lens 65 for collecting light emitted from each light emitting light diode is disposed on an emitting side of the light emitting diode 64 in which the light emitting diodes in the respective colors are arranged in the array, and the light source unit 63 so configured may be disposed in such a manner that the optical axis of the light source unit 63 coincides with the optical axis of the light tunnel 75.

Figure 10:
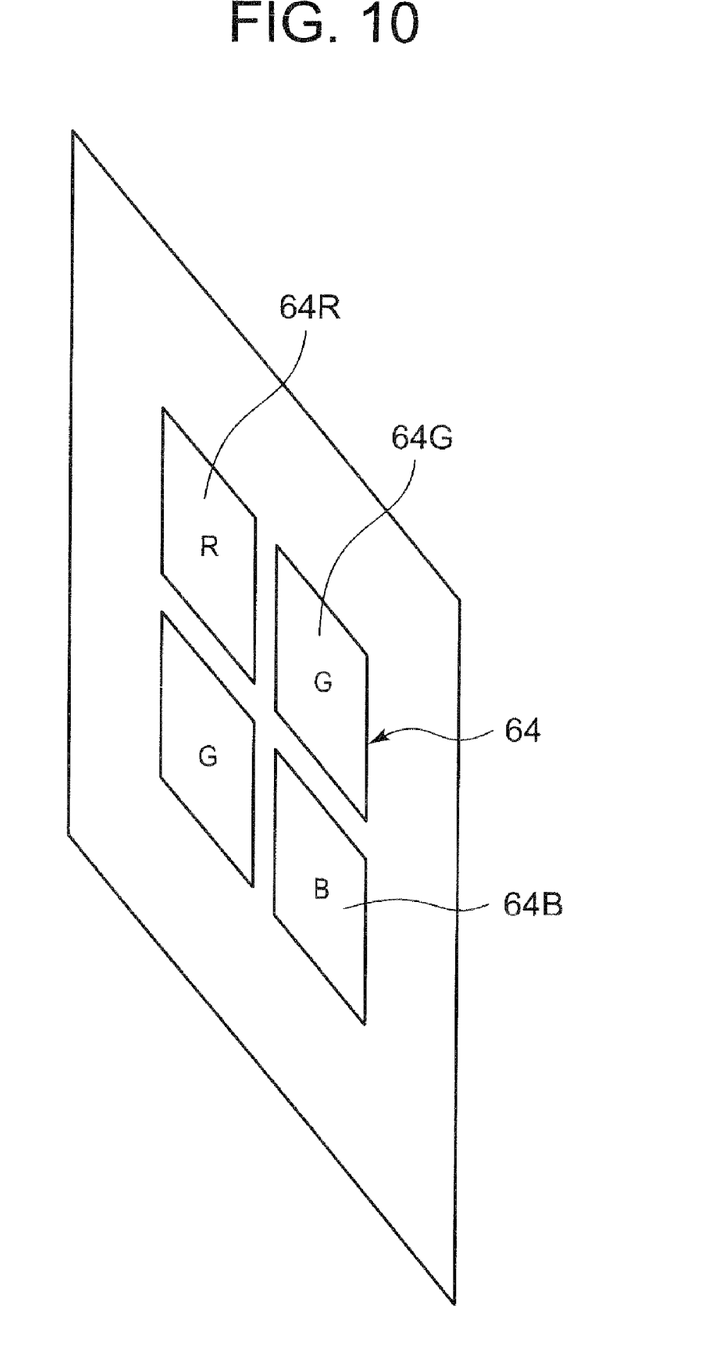
FIG. 10 is a concept diagram showing how light emitting diodes are disposed according to the modified example of the invention.

In this case, in the light source unit 63, since the amount of light of the green light emitting diode 64G is smaller than the amounts of light of the red and blue light emitting diodes 64R, 64B, in order to supplement the luminance of the green light emitting diode 64G, as is shown in FIG. 10, more green light emitting diodes 64G are disposed. By disposing more green light emitting diodes 64G than the red and blue light emitting diodes 64R, 64B in this way, the amounts of light emitted from the respective light emitting diodes 64 can be made uniform, thereby making it possible to provide a clear image.

In addition, the size of the light tunnel 75 is not limited to the numeric values described in the embodiment, and since the angle formed by both the lateral sides 77 and the optical axis X is increased, the area of the emitting side 75b is increased accordingly, light which is parallel to the optical axis can be emitted. However, since when the angle formed by both the lateral sides 77 and the optical axis X is increased too much, the area of the light beam emitted from the light tunnel 75 becomes too large, the increase in the angle in question is preferably on the order of one degree. Additionally, since the maximum incident angle of light which is incident on the incident side 75a of the light tunnel 75 to become effective light is about 30 degrees, the longitudinal length of the light tunnel 75 is preferably five or more times the lengths of one side of the square incident side 75a in order for light incident on the incident side 75a at the maximum angle to become effective light.

Figure 11:
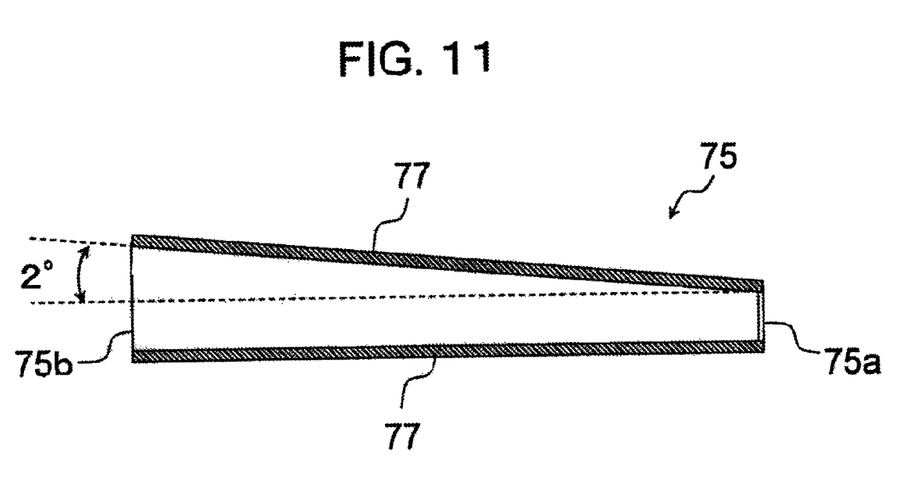
FIG. 11 is a top view of a light tunnel according to an embodiment of the invention.

As shown in FIG. 11, in place of the lateral sides 77 of the light tunnel 75 being disposed in such a manner as to confront each other in the oblique or tapered fashion, one of the lateral sides can be disposed in such a manner as to confront the other lateral side obliquely at an angle of two degrees which is double the angle used in the embodiment relative to the incident side 75a and the emitting side 75b, so as to obtain a similar effect to that obtained in the embodiment described above. Disposing only one of the lateral sides in the oblique fashion in the way described above can facilitate the fabrication of the light tunnel 75.

Furthermore, there may be adopted a configuration in which the upper side and the lower side are disposed in such a manner as to confront each other in an inclined or tapered fashion so that the vertical length of the emitting side 75b becomes longer than the vertical length of the incident side 75a. By disposing also the upper and lower sides obliquely in the way described above, since a vertical light beam can also be formed into a light beam which is nearly parallel to the optical axis X, light that is emitted from the light source unit 63 to become unnecessary can be reduced further, thereby making it possible to increase further the light utilization efficiency.

Figure 12:
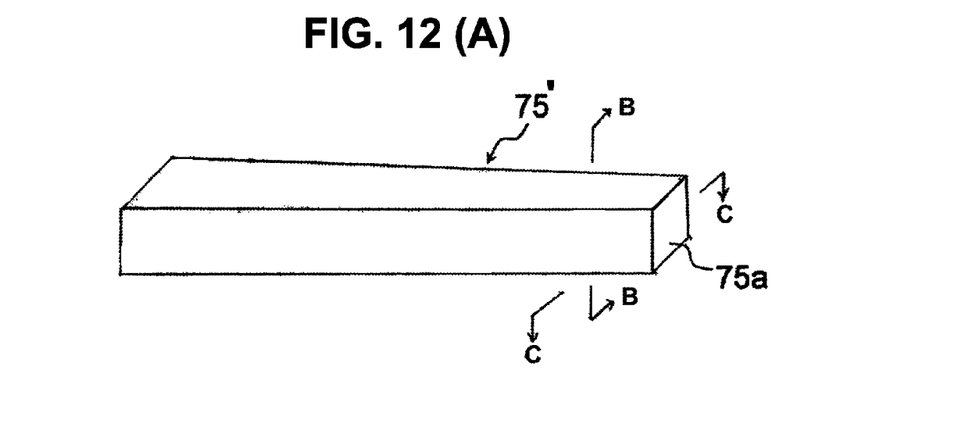

In addition, in the embodiment described above, while the light tunnel 75 is used as the light smoothing unit, a light guiding or smoothing rod 75' may be used, and by forming lateral sides or upper and lower sides of the rod 75' in the oblique or inclined fashion, as shown in FIGS. 12A-C, the same effect can be obtained as that obtained by the light tunnel 75. In addition, in order for the lateral sides or upper and lower sides of the light smoothing rod 75' to be formed in the oblique or inclined fashion, lateral sides or upper and lower sides of a rectangular parallelepiped light smoothing rod may only have to be cut in the oblique or inclined fashion, and this facilitates the fabrication of the light smoothing rod 75'.

In addition, the invention is not limited to the embodiments and modified example of the invention, and hence, the invention can be modified and/or improved freely without departing from the spirit and scope of the invention.

What is claimed is:

1. An optical system unit for projecting images, comprising:
    a light source-side optical system having a light smoothing unit for uniformly distributing an intensity of incident light and emitting the distributed light;
    a display device for forming an image by reflected light; and
    a projection-side optical system,
    whereby a light beam emitted from a light source unit is shone onto the display device via the light source-side optical system so as to form an image by the display device, and the formed image is projected onto a screen via the projection-side optical system,
    wherein the light smoothing unit is formed into a substantially truncated quadrangular pyramid such that upper, lower, left and right sides thereof are light reflection surfaces, an incident side thereof is formed into a square, and an emitting side thereof is formed into a horizontally elongated rectangle having an area which becomes larger than an area of the incident side,
    wherein only one of the left side and the right side of the light smoothing unit is made oblique relative to the incident side and the emitting side, and
    wherein said only one of the left side and the right side of the light smoothing unit is disposed obliquely at an angle of two degrees relative to a face line of the incident side.

2. An optical system unit for projecting images as set forth in claim 1, wherein the light smoothing unit is a light tunnel.

3. An optical system unit for projecting images as set forth in claim 2, wherein the light tunnel has four substantially quadrangular plates including an upper plate, a lower plate, a left plate, and a right plate, which constitute, respectively, the upper, lower, left and right sides of the light tunnel, and is formed into the substantially truncated quadrangular pyramid by placing the upper plate and the lower plate, respectively, on and underneath upper and lower horizontal sides of the left and right plates and fixedly bonding them together along the vicinities of ridges.

4. An optical system unit for projecting images as set forth in claim 1, wherein the light smoothing unit is a light smoothing rod.

5. An optical system unit for projecting images as set forth in claim 1, wherein the projection-side optical system comprises a diaphragm, the diaphragm having an opening which is formed into a vertically elongated oval shape.

6. An optical system unit for projecting images as set forth in claim 1, wherein the light smoothing unit is configured such that a length in the direction of the optical axis is made five or more times the lengths of one side of the incident side.

7. A projector comprising a cooling fan, a projector control unit, and the optical system unit for projecting images set forth in claim 1.

8. A projector as set forth in claim 7, wherein the light source unit comprises a discharge lamp and a reflector which is formed into the shape of an ellipsoid of revolution or a paraboloid of revolution for collecting light emitted from the discharge lamp in a position in a vicinity of a focal point, and wherein a color wheel is provided between the light source unit and the light smoothing unit.

9. A projector as set forth in claim 7, wherein the light source unit comprises light emitting diodes of a plurality of colors and condenser lenses for collecting light emitted from the light emitting diodes.

10. A projector as set forth in claim 9, wherein the light source unit comprises a dichroic prism, wherein a red light emitting diode, a green light emitting diode and a blue light emitting diode are disposed, respectively, on three sides of the dichroic prism, and wherein the condenser lenses are disposed, respectively, between the dichroic prism and the light emitting diodes of the respective colors.

11. A projector as set forth in claim 9, wherein the light source unit is configured such that the light emitting diodes of a plurality of colors are arranged in an array, and wherein the condenser lenses are disposed in front of the light emitting diodes of the plurality of colors.

* * * * *